US009850931B2

United States Patent
Westphal et al.

(10) Patent No.: US 9,850,931 B2
(45) Date of Patent: Dec. 26, 2017

(54) BEAM FLANGE CLAMP, STRUCTURAL BEAM JOINT WITH BEAM FLANGE CLAMPS AND METHOD FOR FORMING A STRUCTURAL BEAM JOINT

(71) Applicant: AIRBUS OPERATIONS GMBH, Hamburg (DE)

(72) Inventors: Stephan Westphal, Hamburg (DE); Jan Richardson Busshoff, Hamburg (DE); Christian Rekert, Hamburg (DE); Benjamin Klotz, Hamburg (DE); Marko Roeschmann, Hamburg (DE); Goulamhossein Nalband-Abbasi, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 164 days.

(21) Appl. No.: 14/857,298

(22) Filed: Sep. 17, 2015

(65) Prior Publication Data

US 2016/0084285 A1    Mar. 24, 2016

(30) Foreign Application Priority Data

Sep. 18, 2014    (EP) .................................... 14185315

(51) Int. Cl.
  *B64C 1/18*    (2006.01)
  *F16B 7/04*    (2006.01)
  (Continued)

(52) U.S. Cl.
  CPC ............ *F16B 7/0486* (2013.01); *B64C 1/061* (2013.01); *B64C 1/18* (2013.01); *B64C 3/18* (2013.01);
  (Continued)

(58) Field of Classification Search
  CPC ... B64C 1/061; B64C 1/18; F16B 2/12; F16B 7/0486; F16B 7/18
  See application file for complete search history.

(56) References Cited

U.S. PATENT DOCUMENTS

| 729,445 A | 5/1903 | Streeter |
| 4,379,651 A * | 4/1983 | Nagashima ............... E04G 7/26 |
| | | 248/228.5 |

(Continued)

FOREIGN PATENT DOCUMENTS

| AU | 4166072 A | 11/1973 |
| AU | 456630 B2 | 12/1974 |

(Continued)

OTHER PUBLICATIONS

Chinese Office Action for Application No. 201510594283 dated Feb. 22, 2017.

(Continued)

*Primary Examiner* — Justin M Benedik
(74) *Attorney, Agent, or Firm* — Jenkins, Wilson, Taylor & Hunt, P.A.

(57) ABSTRACT

A beam flange clamp includes a clamp body having a first vise jaw portion with a first gripping surface and a second vise jaw portion with a second gripping surface. The first gripping surface and the second gripping surface are oriented parallel to each other and are offset in height by a predetermined clamping distance. The clamp body further including a bolting portion protruding from the second vise jaw portion opposite of the first vise jaw portion, and at least one bolting hole is formed through the bolting portion.

13 Claims, 1 Drawing Sheet

(51) Int. Cl.
  *F16B 2/12* (2006.01)
  *B64C 1/06* (2006.01)
  *B64C 3/18* (2006.01)
  *F16B 7/18* (2006.01)

(52) U.S. Cl.
  CPC ............. *F16B 2/12* (2013.01); *F16B 7/0493* (2013.01); *F16B 7/18* (2013.01)

(56) References Cited

U.S. PATENT DOCUMENTS

| | | | | |
|---|---|---|---|---|
| 4,422,609 | A | * | 12/1983 | Clark .................... F16B 5/0642 248/228.1 |
| 4,490,066 | A | * | 12/1984 | Hanlon ................. E04B 1/5812 403/384 |
| 5,146,724 | A | * | 9/1992 | Angelo .................... F16B 2/02 248/228.1 |
| 7,021,855 | B2 | | 4/2006 | Hardtke et al. |
| 8,167,258 | B1 | * | 5/2012 | Wentworth ........... E04B 1/2403 248/214 |
| 8,511,929 | B2 | * | 8/2013 | Raye ........................ B60T 7/20 248/220.22 |
| 8,770,885 | B2 | * | 7/2014 | Myers ...................... F16B 2/12 403/374.3 |
| 9,309,905 | B2 | | 4/2016 | Lacroix |
| 9,604,611 | B2 | * | 3/2017 | Raye ...................... B60T 8/176 |
| 2013/0308999 | A1 | | 11/2013 | Black |
| 2016/0083070 | A1 | | 3/2016 | Westphal et al. |

FOREIGN PATENT DOCUMENTS

| | | |
|---|---|---|
| CN | 1380477 A | 11/2002 |
| CN | 103062172 A | 4/2013 |
| ES | 2432915 A1 | 12/2013 |
| FR | 401376 A | 8/1909 |
| FR | 899812 A | 6/1945 |
| FR | 2868503 A1 | 10/2005 |
| FR | 2964174 A1 | 3/2012 |
| GB | 07808 | 3/1898 |
| GB | 461953 A | 2/1937 |
| GB | 1247025 A | 9/1971 |
| GB | 2481903 B | 11/2014 |
| JP | 2004 340232 A | 12/2004 |
| KR | 2011 0008808 U | 9/2011 |
| KR | 20110008808 * | 9/2011 |
| WO | WO 2013/104889 A2 | 7/2013 |

OTHER PUBLICATIONS

European Search Report for Application No. EP 14185315 dated Mar. 12, 2015.
European Search Report for Application No. EP 14 18 5311 dated Mar. 12, 2015.
Non-Final Office Action for U.S. Appl. No. 14/857,353, dated May 8, 2017.
Chinese Office Action for Application No. 201210599900 dated Apr. 19, 2017.

* cited by examiner

BEAM FLANGE CLAMP, STRUCTURAL BEAM JOINT WITH BEAM FLANGE CLAMPS AND METHOD FOR FORMING A STRUCTURAL BEAM JOINT

CROSS-REFERENCE TO RELATED APPLICATION

This patent application claims priority to European Patent Application 14185315.0 filed Sep. 18, 2014, the entire disclosure of which is incorporated by reference herein.

TECHNICAL FIELD

The present disclosure relates to a beam flange clamp, a structural beam joint using such clamps and a method for forming structural beam joint using beam flange clamps, specifically in the aerospace industry for structural beams of aircraft floor grids, aircraft fuselage or aircraft wing boxes.

BACKGROUND

Beams, joists and frames for construction work, for example in aeronautics, civil engineering or architecture, are designed to withstand bending forces acting perpendicularly to the direction of extension of the respective beams. Conventional beams may be implemented as integral parts with flanges at the edges and a web spanning between the flanges.

Such beams used for building of a structural framework, i.e. structural beams, need to be connected at joint locations where beams running at an angle with respect to each other intersect. The intersecting beams need to be kept in alignment with each other, especially at those intersections—therefore, connection techniques have been developed to force-fit or friction-lock the intersecting beams with each other.

For example, if the beams are placed on top of each other with a bottom flange portion of the upper beam lying flat on a top flange portion of the lower beam, congruent holes or cutouts may be provided in the respective flange portions which are brought into alignment in order to attach the bottom flange portion of the upper beam the top flange portion of the lower beam by riveting or bolting. Such a connection requires sufficient edge margins, pitches, material thicknesses and accessibility for riveting tools. Therefore, the connection of the beams is already planned at a design stage in order to provide for the necessary bores. Additional or late modifications after design stage often lead to considerable additional effort in re-planning and are difficult to apply in already manufactured beams.

Other approaches include providing standardized or custom-made interlocking means that have recesses to receive the respective parts of the beams to be interlocked. For example, document U.S. Pat. No. 4,379,651 A discloses a method for rigidly fastening two intersected metal profiles by four L-shaped members enclosing respective side faces of the metal profiles. Document U.S. Pat. No. 729,445 A discloses means for clamping and securing cross metal beams together that include securing clips with edgewise fitting notched partitions for receiving flanges of crossed metal beams.

SUMMARY

One feature of the disclosure herein is to provide solutions for connecting intersecting structural beams at the intersecting joint positions which allow for independence of the beam design. Moreover, it is an object of the disclosure herein to provide for beam interconnection solutions that do not require one of the beams to have specific design features such as bores or recesses for receiving the joint interconnection.

A first aspect of the disclosure pertains to a beam flange clamp comprising a clamp body having a first vise jaw portion with a first gripping surface and a second vise jaw portion with a second gripping surface. The first gripping surface and the second gripping surface are oriented parallel to each other and are offset in height by a predetermined clamping distance. The clamp body further comprises a bolting portion protruding from the second vise jaw portion opposite of the first vise jaw portion, and at least one bolting hole is formed through the bolting portion.

According to a second aspect of the disclosure, a structural beam joint comprises a first structural beam having a web portion and at least one first flange portion, a second structural beam having at least one second flange portion, the second structural beam having an axis of extension being angled with respect to the axis of extension of the first structural beam and intersecting with the first structural beam, at least one beam flange clamp according to the first aspect of the disclosure, and at least one fastening pin or bolt inserted in the at least one bolting hole of the at least one beam flange clamp. The at least one first flange portion of the first structural beam abuts the at least one second flange portion of the second structural beam. The at least one fastening pin or bolt tightens the clamp body of the at least one beam flange clamp to the web portion of the first structural beam so that the first gripping surface of the at least one beam flange clamp presses the at least one second flange portion of the second structural beam to the at least one first flange portion of the first structural beam.

According to a third aspect of the disclosure, a method for forming a structural beam joint comprises abutting a first flange portion of a first structural beam to a second flange portion of a second structural beam, the second structural beam having an axis of extension being angled with respect to the axis of extension of the first structural beam and intersecting with the first structural beam; pressing a first gripping surface of a beam flange clamp which comprises a clamp body having a first vise jaw portion with a first gripping surface and a second vise jaw portion with a second gripping surface, the first gripping surface and the second gripping surface being oriented parallel to each other and being offset in height by a predetermined clamping distance, to the second flange portion of the second structural beam against the first flange portion of the first structural beam; introducing a fastening pin or bolt in a bolting hole being formed through a bolting portion protruding from the second vise jaw portion opposite of the first vise jaw portion of the clamp body of the beam flange clamp; and tightening the clamp body of the beam flange clamp to the web portion of the first structural beam by the fastening pin or bolt.

According to a fourth aspect of the disclosure, an aircraft includes a floor framework a floor framework with interconnected structural beams, wherein the structural beams are interconnected with structural beam joints according to the second aspect of the disclosure.

The idea on which the present disclosure is based is to use one or more vise type components that are securely fastened to only one of the intersecting beams by riveting or bolting and that are able to clamp abutting flange portions of the intersecting beams to each other. Riveting or bolting advantageously is performed in a web portion of one of the structural beams which allows for a very mechanically stable and reliable bolting connection. The use of vise type components does not require the other one of the intersecting beams to be specifically prepared with bores, bolting holes or other fastening measures, therefore simplifying the mounting procedure for the beam joint as well as enhancing the flexibility in clamping together beams of different designs.

Particularly advantageous may additionally be the reduction of costs, weight, lead time, part count and manufacturing complexity coming along with being independent of beam design when designing the structural beams to be interconnected. Beam-to-beam connections may be changed in a very late stage of the framework manufacturing processes with little to no additional effort. Retrofitting and cabin customization is advantageously applicable when employing the solution of the disclosure herein, specifically due to the flexibility to adapt the interconnection mechanisms of the disclosure herein to existing or legacy structural beams.

According to an embodiment of the beam flange clamp or the method, the clamp body may be substantially C-shaped, the first vise jaw portion and the second vise jaw portion forming the legs of the C-shaped clamp body.

According to a further embodiment of the beam flange clamp or the method, the clamp body may be chamfered at the vertices of the C-shape and/or the distal end of the first vise jaw portion. This may facilitate mounting access to the beam flange clamp at the structural beam joint.

According to a further embodiment of the beam flange clamp or the method, the thickness of the bolting portion may be smaller than the thickness of the second vise jaw portion. This allows for easier access to fastening the bolt, while at the same time saving material and thus weight in manufacturing the clamp body.

According to a further embodiment of the beam flange clamp, the clamp body may be integrally formed from one of a metal, a metal alloy and plastics. Such integrally formed clamps are easy and inexpensively to manufacture in conventional manufacturing processes.

According to an embodiment of the structural beam joint, the first structural beam may have an H-shaped cross-section. According to a further embodiment of the structural beam joint, the second structural beam may have an H-shaped or T-shaped cross-section. Such beams are often used as supporting beams for framework structure, such as a floor framework for an aircraft.

According to a further embodiment of the structural beam joint, the structural beam joint may specifically comprise four beam flange clamps according to the first aspect of the disclosure with two of the four beam flange clamps clamping opposite sides of the second flange portion of the second structural beam to respectively opposite sides of the at least one first flange portion of the first structural beam. The four beam flange clamps may be positioned in each corner of the intersection between the two structural beams, thus reliably and firmly fixing the structural beam joint.

According to a further embodiment of the method, the method may comprise repeating the steps of pressing, introducing and tightening for four beam flange clamps with two of the four beam flange clamps clamping opposite sides of the second flange portion of the second structural beam to respectively opposite sides of the web portion of the first structural beam. Therefore, the four beam flange clamps may be positioned in each corner of the intersection between the two structural beams, thus reliably and firmly fixing the structural beam joint.

BRIEF DESCRIPTION OF THE DRAWINGS

The disclosure herein will be explained in greater detail with reference to exemplary embodiments depicted in the drawings as appended.

The accompanying drawings are included to provide a further understanding of the present disclosure and are incorporated in and constitute a part of this specification. The drawings illustrate the embodiments of the present disclosure and together with the description serve to explain the principles of the disclosure herein. Other embodiments of the present disclosure and many of the intended advantages of the present disclosure will be readily appreciated as they become better understood by reference to the following detailed description. The elements of the drawings are not necessarily to scale relative to each other. Like reference numerals designate corresponding similar parts.

DETAILED DESCRIPTION

Figure 1:
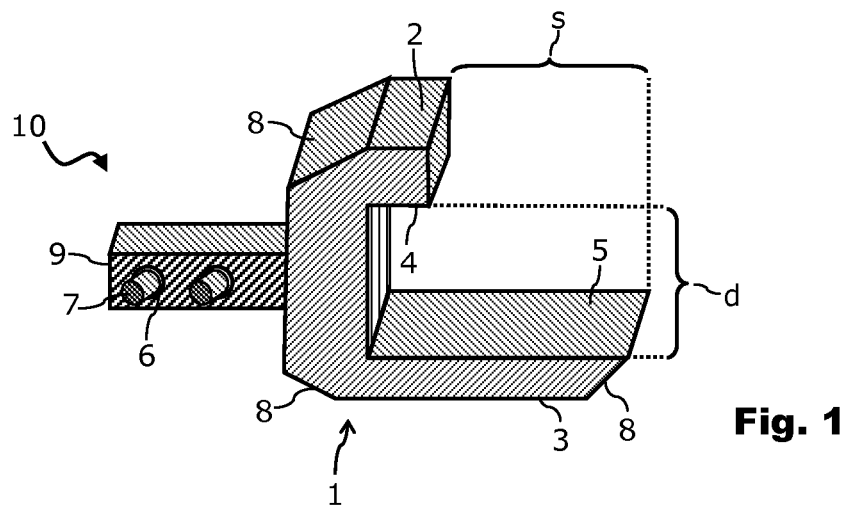
FIG. 1 schematically illustrates a perspective view of a beam flange clamp according to an embodiment of the disclosure herein.

In the figures, like reference numerals denote like or functionally like components, unless indicated otherwise. Any directional terminology like "top", "bottom", "left", "right", "above", "below", "horizontal", "vertical", "back", "front", and similar terms are merely used for explanatory purposes and are not intended to delimit the embodiments to the specific arrangements as shown in the drawings.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. Generally, this application is intended to cover any adaptations or variations of the specific embodiments discussed herein.

Structural beams within the meaning of this disclosure comprise any longitudinally extended, rigid member or structure that is loaded transversely, such as oblong bars of metal, metal alloys, plastics or other rigid or semi-rigid materials. Structural beams within the meaning of the disclosure herein may comprise crossbeams, longerons, stringers, frames, struts, ribs, spars, stabilizers, formers and similar structural members.

The methods and mechanisms for joining structural beams as disclosed hereinforth may be used in a lot of applications, including—but not limited to—constructions of frames, stringers and crossbeams in aircraft, interior design, bridge building, vehicle carriages, civil engineering, applications for children's toys and similar.

FIG. 1 shows a schematic illustration of a beam flange clamp 10. The beam flange clamp 10 of FIG. 1 has a clamp body 1 that may for example be formed from metal, metal alloy or plastics, in particular as an integral clamp body. The clamp body 1 is generally C-shaped with a first vise jaw portion 3 extending horizontally and a second vise jaw portion 2 extending parallel thereto in a predetermined distance. In other words, the vise jaw portions 2 and 3 form legs of the C-shape of the clamp body 1. At the vertices of the C-shape, the clamp body 1 may comprise chamfered edges 8. Similarly, the distal end of the first and second vise jaw portions 2 and 3 may be chamfered as well. When seen in the direction of the axes of extension of any of the vise jaw portions 2 and 3, the clamp body 1 may have a rectangular cross section. Thus, on each of the vise jaw portions 2 and 3, gripping surfaces 4 and 5 are formed which are facing one another towards the middle of the C-shape. The first gripping surface 5 on top of the first vise jaw portion 3 is oriented parallel to the second gripping surface 4 on the bottom of the first vise jaw portion 2. Both gripping surfaces 4 and 5 are facing generally in the opposite direction, i.e. upwards and downwards in the illustration of FIG. 1, respectively.

By virtue of the spacing apart of the second vise jaw portion 2 with respect to the first vise jaw portion 3, the gripping surfaces 4 and 5 are offset in height by a predetermined clamping distance d with respect to each other. The first gripping surface 5 and the second gripping surface 4 may thus sandwich a first flat component therebetween. If the thickness of the first flat component should be smaller than the non-zero clamping distance d the space between the gripping surfaces 4 and 5 allows for insertion of another second flat component to be gripped between the first or second gripping surface 4, 5 and the first flat component.

The second vise jaw portion 2 is formed to protrude less than the first vise jaw portion 3 from the connecting region, i.e. the extension of the second vise jaw portion 2 with respect to the first vise jaw portion 3 is smaller by an amount s which corresponds to a swiveling leeway distance. The distance s provides for leeway when mounting the clamp body 1 to first and second flat components in contact with each other. To that end, the clamp body 1 will be brought into contact with the first and second flat components along a non-zero attachment angle and then turned downwards in a swiveling motion until the first vise jaw portion 3 reaches under the lower flat component. The setback of the second vise jaw portion 2 by the distance s ensures that the second vise jaw portion 2 will not geometrically prevent the attachment of the clamp body 1 at a non-zero attachment angle to the flange portions of the flat components.

It should be noted that the distance s may be chosen according to the desired properties of the force-fit of the beam flange clamp 10 with the components to be clamped. In particular, the distance s may even be chosen to correspond with the distance of extension of the first vise jaw portion 3, i.e. the second vise jaw portion 2 does not necessarily need to protrude from the main clamp body 1 at all.

In a manner similar to a vise, the beam flange clamp 10 may then be tightened to the first flat component by a bolt or pin 7 that is pushed through at least one bolting hole 6 which is formed through a bolting portion 9 that is part of the clamp body 1 and protruding from the first and second vise jaw portions 2 and 3 opposite of the opening of the C-shape of the vise jaw portions 2 and 3, and a corresponding bolting hole 25 in the first flat component. The bolt or pin 7 may for example be threaded so that respective screwing nuts may be tightened on both sides of the bolt or pin 7, thereby forming a force-fit between the first and possibly second flat components and the vise jaw portions 2 and 3.

By reducing the thickness of the bolting portion 9 with regard to the vise jaw portions 2 and 3, i.e. recessing the clamp body 1 in the region of the bolting portion 9, the overall weight of the clamp body 1 may be kept small. Of course, it may be possible to provide for more than one bolting hole 6 in the clamp body 1, as exemplarily illustrated in FIG. 1. Particularly useful may be the provision of at least two bolting holes 6 in a row along the extension of the bolting portion 9 in order to provide for sufficient torsional stability.

Figure 2:
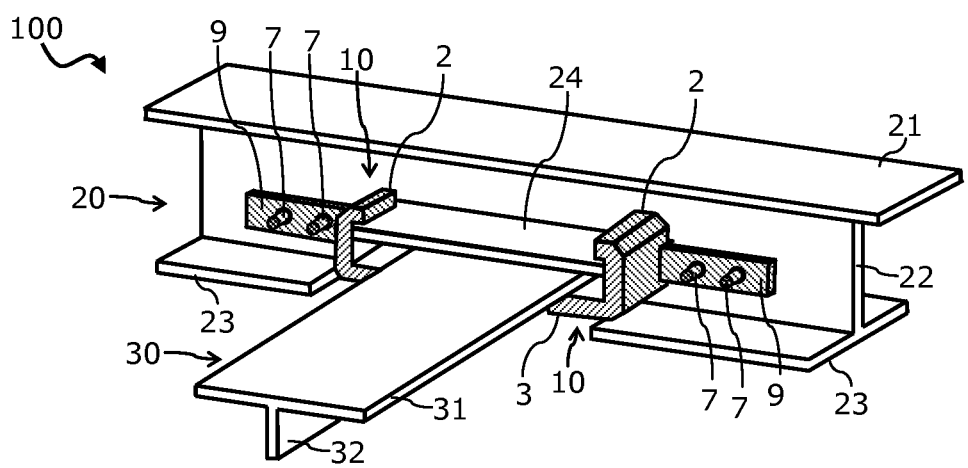
FIG. 2 schematically illustrates a perspective view of a structural beam joint according to another embodiment of the disclosure herein.

FIG. 2 schematically illustrates a structural beam joint 100 of two structural beams 20 and 30, which are shown only partially here for reasons of lucidity in the drawing. The structural beam joint 100 is an intersection of a first structural beam 20 having a web portion 22, a top flange portion 21 and at least one bottom flange portion. The structural beam 20 may for example be an H-shaped crossbeam. The bottom flange portion is in the case of the structural beam 20 made up from a flange portion 23 outside the joint area and a flange portion 24 at the joint area with the structural beam 30. The flange portion 24 is recessed within the web portion 22 with respect to the flange portion 23, i.e. the height of the web portion 22 (distance between the top flange portion 21 and the respective bottom flange portion) is lower in the region of the flange portion 24 than in the region of the flange portion 23. This recess aids in placing the beam 20 on top of the beam 30 at the intersection in order to keep the overall height of the intersection area as low as possible. However, it should be noted that the division of flange portions 23 and 24 is only exemplary in FIG. 2, and a flange portion 23 of continuous extension throughout the joint area with the structural beam 30 may equally be possible as well. In particular, the interconnection mechanism for the two structural beams 20 and 30 with beam flange clamps 10 as illustrated in FIG. 1 is not dependent on the form or shape of the flange portions 23, 24.

The second structural beam 30 which may be an H-shaped or T-shaped crossbeam has at least one second flange portion 31. The second structural beam 30 is arranged along an axis of extension which is angled with respect to the axis of extension of the first structural beam 20 so that the structural beams 20 and 30 intersect each other at an intersecting region. In the exemplary illustration of FIG. 2 the intersection angle may be 90°, however, any other angle may be equally possible as well.

Two beam flange clamps 10 are shown in FIG. 1 on one side face of the web portion 22 of the first structural beam 20. The beam flange clamps 10 are illustrated according to the embodiment of FIG. 1. It should further be noted that the back side face of the web portion 22 may be provided with two similar beam flange clamps 10 according to either FIG. 1 as well. One front side and back side pair of beam flange clamps 10 may be provided at each side of the web portion 32 of the structural beam 30, so that an overall number of four beam flange clamps 10 may be provided in each inner corner of the structural beam joint 100.

Fastening pins or bolts 7 are inserted in the bolting holes 6 of the beam flange clamps 10. In congruence with the clamp bolting holes 6, flange bolting holes 25 may be cut, milled or otherwise introduced in the web portion 22 of the first structural beam 20. The clamp bolting holes 6 are then brought into alignment with the flange bolting holes 25 so that the fastening pins or bolts 7 may reach from the front side of the beam flange clamps 10 to the backside of the web portion 22.

The structural beams 20 and 30 are arranged in such a manner that bottom flange portion 24 of the first structural beam 20 abuts the top flange portion 31 of the second structural beam 30. By tightening the fastening pins or bolts 7 the clamp body 1 of the beam flange clamps 10 sandwiches the top flange portion 31 of the second structural beam 30 between the top flange portion 24 of the first structural beam 20 and the first gripping surface 5 of the beam flange clamps 10. In other words, the beam flange clamps 10 presses the top flange portion 31 of the second structural beam 30 to the bottom flange portion 24 of the first structural beam 20, thereby interlocking the two structural beams 20 and 30 in firm force-fit arrangement. By using four of such beam flange clamps 10 in the different inner corners of the structural beam joint 100, i.e. two of the four beam flange clamps 10 clamping opposite sides of the top flange portion 31 of the second structural beam 30 to respectively opposite sides of the bottom flange portion 24 of the first structural beam 20, the relative angular position of the structural beams 20 and 30 towards each other may remain fixed.

Figure 3:
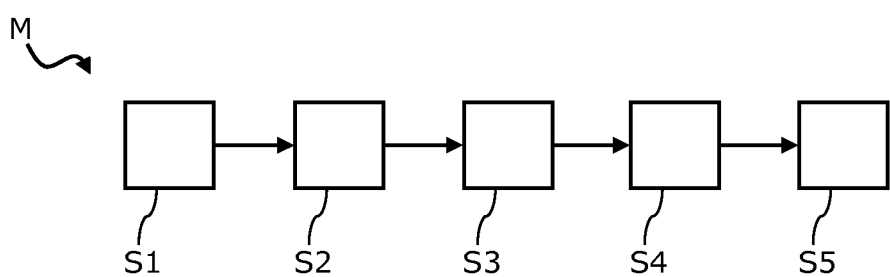
FIG. 3 schematically illustrates a block diagram of a method for forming a structural beam joint according to another embodiment of the disclosure herein.

FIG. 3 schematically illustrates a method M for forming a structural beam joint, such as a structural beam joint 100 as shown and explained in conjunction with FIG. 2. The method M may for example advantageously employ beam flange clamps such as the beam flange clamp 10 as illustrated and explained in conjunction with FIG. 1.

The method M for forming a structural beam joint comprises at S1 abutting a first flange portion 24 of a first structural beam 20 to a second flange portion 31 of a second structural beam 30. The second structural beam 30 may have its axis of extension being angled with respect to the axis of extension of the first structural beam 20 such that an intersection of the two structural beams 20 and 30 is formed. At S2, a first gripping surface 5 of a beam flange clamp 10 is pressed to the second flange portion 31 of the second structural beam 30 against the first flange portion 24 of the first structural beam 20. The beam flange clamp 10 being used may in particular be a beam flange clamp 10 as shown and explained in conjunction with FIG. 1.

Then, at S3, a fastening pin or bolt 7 is introduced in a bolting hole 6 being formed through a bolting portion 9 protruding from the second vise jaw portion 2 opposite of the first vise jaw portion 3 of the clamp body 1 of the beam flange clamp 10, such that at S4, the clamp body 1 of the beam flange clamp 10 may be tightened to the web portion 22 of the first structural beam 20 by the fastening pin or bolt 7.

As schematically illustrated as S5, the steps S2, S3 and S4 may be repeated for four beam flange clamps 10 with two of the four beam flange clamps 10 clamping opposite sides of the second flange portion 31 of the second structural beam 30 to respectively opposite sides of the web portion 22 of the first structural beam 20.

The method M as well as the resulting structural beam joints 100 may be advantageously used for forming a structural framework such as a floor framework of an aircraft. Such a floor framework with interconnected structural beams 20, 30 at structural beam joints 100 aids in easier cabin customization and facilitates re-design of floor frameworks even after the design of the structural beams 20 and particularly 30 has already been finished.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification.

The embodiments were chosen and described in order to best explain the principles of the disclosure herein and its practical applications, to thereby enable others skilled in the art to best utilize the disclosure herein and various embodiments with various modifications as are suited to the particular use contemplated. While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. In the appended claims and throughout the specification, the terms "including" and "in which" are used as the plain-English equivalents of the respective terms "comprising" and "wherein," respectively. Furthermore, "a" or "one" does not exclude a plurality in the present case. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A structural beam joint, comprising:
    a first structural beam comprising a web portion and at least one first flange portion;
    a second structural beam comprising at least one second flange portion, wherein an axis of extension of the second structural beam is oriented at an angle relative to an axis of extension of the first structural beam, such that the first structural beam is oriented to intersect with the second structural beam;
    at least one beam flange clamp comprising a clamp body having:
        a first vise jaw portion with a first gripping surface;
        a second vise jaw portion with a second gripping surface, wherein the first gripping surface and the second gripping surface are oriented parallel to each other and are offset in height by a predetermined clamping distance;
        a bolting portion protruding from the second vise jaw portion, opposite the first vise jaw portion, and
        at least one bolting hole formed through the bolting portion; and
    at least one fastening pin or bolt inserted in the at least one bolting hole,
    wherein the at least one first flange portion abuts the at least one second flange portion, and
    wherein the at least one fastening pin or bolt is configured to tighten the clamp body to the web portion of the first structural beam, so that the clamp body sandwiches the at least one second flange portion between the at least one first flange portion and the first gripping surface of the clamp body.

2. The structural beam joint according to claim 1, wherein the clamp body is substantially C-shaped, the first vise jaw portion and the second vise jaw portion forming respective legs of the C-shaped clamp body.

3. The structural beam joint according to claim 2, wherein the clamp body is chamfered at at least one vertex of the C-shape and at a distal end of the first vise jaw portion.

4. The structural beam joint according to claim 1, wherein a thickness of the bolting portion is smaller than a thickness of the second vise jaw portion.

5. The structural beam joint according to claim 1, wherein the clamp body is integrally formed from one of a metal, a metal alloy and plastics.

6. The structural beam joint according to claim 1, wherein the at least one fastening pin or bolt is configured to tighten the clamp body to the web portion of the first structural beam so that the first gripping surface presses the at least one second flange portion to the at least one first flange portion.

7. The structural beam joint according to claim 6, wherein the first structural beam has an H-shaped cross-section, and wherein the second structural beam has an H-shaped or T-shaped cross-section.

8. The structural beam joint according to claim 6, wherein the at least one beam flange clamp comprises four beam flange clamps,
wherein two of the four beam flange clamps clamp opposite sides of the second flange portion to respectively opposite sides of the web portion of the first structural beam.

9. The structural beam joint according to claim 6, wherein the first structural beam has an H-shaped cross-section, or wherein the second structural beam has an H-shaped or T-shaped cross-section.

10. A method for forming a structural beam joint, the method comprising:
abutting a first flange portion of a first structural beam to a second flange portion of a second structural beam, the second structural beam having an axis of extension being angled with respect to the axis of extension of the first structural beam and intersecting with the first structural beam;
sandwiching the second flange portion between the first flange portion and a first gripping surface of a beam flange clamp, wherein the beam flange clamp comprises a clamp body having a first vise jaw portion, with the first gripping surface, and a second vise jaw portion, with a second gripping surface, the first gripping surface and the second gripping surface being oriented parallel to each other, and being offset in height by a predetermined clamping distance;
introducing a fastening pin or bolt in a bolting hole formed through a bolting portion protruding from the second vise jaw portion, opposite the first vise jaw portion, of the clamp body; and
tightening, using the fastening pin or bolt, the clamp body to the web portion of the first structural beam.

11. The method according to claim 10, wherein the clamp body is substantially C-shaped, the first vise jaw portion and the second vise jaw portion forming respective legs of the C-shaped clamp body.

12. The method according to claim 10, comprising:
repeating steps of sandwiching, introducing, and tightening for four beam flange clamps, wherein two of the four beam flange clamps clamp opposite sides of the second flange portion to respectively opposite sides of the web portion of the first structural beam.

13. An aircraft comprising:
a floor framework with interconnected structural beams, wherein the interconnected structural beams comprise a first structural beam, which comprises a web portion and at least one first flange portion, and a second structural beam, which comprises at least one second flange portion, and wherein the second structural beam has an axis of extension that is oriented at an angle relative to an axis of extension of the first structural beam, such that the second structural beam intersects with the first structural beam,
wherein the interconnected structural beams are interconnected with structural beam joints, each of the structural beam joints comprising:
at least one beam flange clamp comprising a clamp body, having:
a first vise jaw portion with a first gripping surface;
a second vise jaw portion with a second gripping surface, wherein the first gripping surface and the second gripping surface are oriented parallel to each other and are offset in height by a predetermined clamping distance;
a bolting portion protruding from the second vise jaw portion, opposite the first vise jaw portion, and
at least one bolting hole formed through the bolting portion; and
at least one fastening pin or bolt inserted in the at least one bolting hole,
wherein the at least one first flange portion abuts the at least one second flange portion, and
wherein the at least one fastening pin or bolt is configured to tighten the clamp body to the web portion of the first structural beam, so that the clamp body sandwiches the at least one second flange portion between the at least one first flange portion and the first dripping surface of the at least one beam flange.

* * * * *